United States Patent
Gustavsson et al.

(10) Patent No.: US 10,020,574 B2
(45) Date of Patent: Jul. 10, 2018

(54) ANTENNA ARRANGEMENT FOR NON-LINEAR DISTORTION MITIGATION

(71) Applicant: Telefonaktiebolaget LM Ericsson (publ), Stockholm (SE)

(72) Inventors: Ulf Gustavsson, Göteborg (SE); Thomas Eriksson, Göteborg (SE); Katharina Hausmair, Göteborg (SE); Per Landin, Agnesberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/513,479

(22) PCT Filed: Sep. 24, 2014

(86) PCT No.: PCT/EP2014/070374
§ 371 (c)(1),
(2) Date: Mar. 22, 2017

(87) PCT Pub. No.: WO2016/045724
PCT Pub. Date: Mar. 31, 2016

(65) Prior Publication Data
US 2017/0310000 A1    Oct. 26, 2017

(51) Int. Cl.
*H04B 7/06* (2006.01)
*H01Q 1/52* (2006.01)
(Continued)

(52) U.S. Cl.
CPC ............ *H01Q 1/523* (2013.01); *H01Q 1/246* (2013.01); *H01Q 21/08* (2013.01); *H04B 7/0456* (2013.01); *H04B 7/0613* (2013.01)

(58) Field of Classification Search
CPC ........ H01Q 1/246; H01Q 1/523; H01Q 21/08; H04B 1/00; H04B 7/00; H04B 7/04;
(Continued)

(56) References Cited

U.S. PATENT DOCUMENTS 6,469,680 B1 * 10/2002 Kelliher ................. H04B 7/10
                                                          343/725
9,503,171 B2 * 11/2016 Yeh ...................... H04B 7/0469
(Continued)

OTHER PUBLICATIONS

Ericsson, "TP on spatial doman impacts of AAS", 3GPP Draft, R4-126888_Spatial_Domain_Impact_of_AAS, 3rd Generation Partnership Project (3GPP), Mobile Competence Centre, 650, Route Des Lucioles, F-06921 Sophia-Antipolis Cedex, France, vol. RAN WG4, No. New Orleans, Nov. 12-Nov. 16, 2012, Nov. 16, 2012 (Nov. 16, 2012), 16 pages, XP050674376.
(Continued)

*Primary Examiner* — Shawkat M Ali
(74) *Attorney, Agent, or Firm* — Rothwell, Figg, Ernst & Manbeck, p.c.

(57) ABSTRACT

The present disclosure relates to an antenna arrangement and a method for radio transmission. The antenna arrangement comprises a pre-coder (310) connected to an antenna array (320). The antenna array (320) comprises a number N of antenna elements $a_i$ (321), i=1, 2, ..., N, each antenna element $a_i$ being configured to receive a respective transmit signal component $TX_i$ from the pre-coder (310). The pre-coder (310) is configured to receive a number M<N of independent data streams $s_j$, j=1, 2, ..., M, and to generate the N transmit signal components, wherein the generating comprises suppressing a correlation between any two transmit signal components $TX_{i1}$ and $TX_{i2}$ received by antenna elements $a_{i1}$ and $a_{i2}$ arranged adjacently in the antenna array (320).

19 Claims, 14 Drawing Sheets

(51) Int. Cl.
*H01Q 1/24* (2006.01)
*H01Q 21/08* (2006.01)
*H04B 7/0456* (2017.01)

(58) Field of Classification Search
CPC .......... H04B 7/06; H04B 7/08; H04B 7/0413; H04B 7/0456; H04B 7/063; H04B 7/0837; H04B 17/12; H04L 5/00; H04L 12/26; H04L 27/00; H04L 27/28; H04W 16/28; H04W 52/04; H04W 72/04; H04W 72/046
USPC ........ 370/252, 328, 329, 330, 334; 375/260, 375/267, 295, 316; 455/69, 522, 562
See application file for complete search history.

(56) References Cited

U.S. PATENT DOCUMENTS

| | | | |
|---|---|---|---|
| 2004/0142729 A1 | 7/2004 | Yuda et al. | |
| 2010/0120460 A1* | 5/2010 | Karlsson | H01Q 3/26 455/517 |
| 2010/0220801 A1* | 9/2010 | Lee | H04B 7/0434 375/267 |
| 2011/0274191 A1* | 11/2011 | Lindgren | H04B 7/0417 375/260 |
| 2012/0033761 A1* | 2/2012 | Guo | G01S 3/023 375/316 |
| 2012/0076019 A1 | 3/2012 | McGowan et al. | |
| 2012/0088537 A1* | 4/2012 | Petersson | H04B 7/0626 455/522 |
| 2013/0258972 A1* | 10/2013 | Kim | H04B 7/0617 370/329 |
| 2014/0348260 A1* | 11/2014 | Lorca Hernando | H04B 7/0617 375/295 |

OTHER PUBLICATIONS

Fager, C., et al., "Prediction of smart antenna transmitter characteristics using a new behavioral modeling approach", 2014 IEEE MTT-S International Microwave Symposium (IMS2014), IEEE, Jun. 1, 2014 (Jun. 1, 2014), 4 pages, XP022615052.

International Search Report and Written Opinion dated May 28, 2015 in International Application No. PCT/EP2014/070374, 9 pages.

* cited by examiner

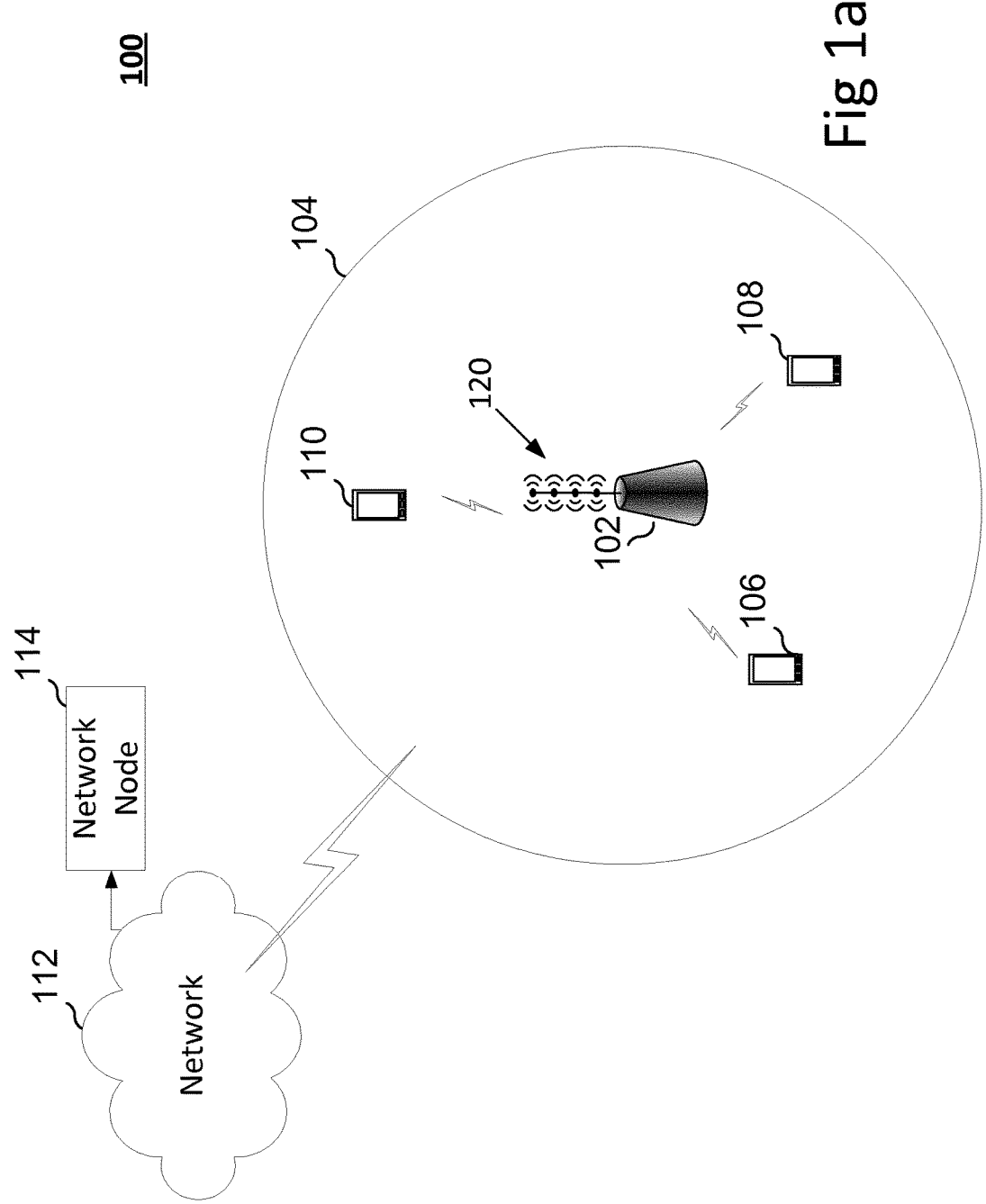

ANTENNA ARRANGEMENT FOR NON-LINEAR DISTORTION MITIGATION

CROSS-REFERENCE TO RELATED APPLICATION(S)

This application is a 35 U.S.C. § 371 National Phase Entry Application from PCT/EP2014/070374, filed Sep. 24, 2014, and designating the United States.

TECHNICAL FIELD

The present disclosure relates to wireless systems and in particular to an antenna arrangement for radio transmission.

BACKGROUND

Most radio frequency (RF) transmitters use some type of power amplifier (PA) in order to amplify a signal prior to its transmission. This amplification is often associated with a non-linear distortive effect on the transmitted signal. For example, PAs may inflict non-linear distortion as amplitude-to-amplitude modulation (AM-AM) and amplitude-to-phase modulation (AM-PM) on a transmitted signal, which tend to be especially severe at high output levels. Consequently, non-linear distortion often limits practically achievable output power levels of a PA, thus reducing the reach of radio transmission and also degrading signal to interference and noise ratio (SINR) at a receiver of the transmitted signal.

In order to mitigate this type of distortion, digital pre-distortion (DPD) techniques are often deployed which compensate for the distortion from PAs. State-of-the-art DPD algorithms tend to be quite complex, requiring extensive processing power and memory resources, which drives production and operating costs of the communications equipment.

Large antenna array wireless systems, such as massive multiple-input multiple-output (MIMO) systems, exploit a large number of active antenna elements to transmit and receive wireless signals. By using large antenna arrays the capacity of a wireless communication system in terms of, e.g., information bits per second and Hertz can be increased compared to corresponding single-input single-output (SISO) wireless systems.

However, performing non-linear distortion mitigation such as DPD or similar becomes prohibitively complex in active antenna systems comprising a large number of non-linear PAs. This is because electromagnetic mutual coupling effects between antenna elements, such as signal leakage between adjacent antenna elements, causes a large number of inter-related distortion components that are difficult to predict and compensate for by a DPD algorithm.

This type of distortion effect seen in large antenna arrays will henceforth be referred to as a mutual coupling-based non-linear distortion effect.

At least partly due to the above, there is a need for alternative distortion mitigation methods of reduced complexity for use in antenna array systems.

SUMMARY

An object of the present disclosure is to provide at least an antenna arrangement, a network node, and methods which seek to mitigate, alleviate, or eliminate one or more of the above-identified deficiencies in the art and disadvantages singly or in any combination.

This object is obtained by an antenna arrangement for radio transmission. The antenna arrangement comprises a pre-coder connected to an antenna array. The antenna array comprises a number N of antenna elements $a_i$, i=1, 2, . . . , N, each such antenna element $a_i$ being configured to receive a respective transmit signal component $TX_i$ from the pre-coder. The pre-coder is configured to receive a number M<N of independent data streams $s_j$, j=1, 2, . . . , M, and to generate the N transmit signal components, wherein the generating comprises suppressing a correlation between transmit signal components $TX_{i1}$ and $TX_{i2}$ received by antenna elements $a_{i1}$ and $a_{i2}$ arranged adjacently in the antenna array.

Hereby, mutual coupling-based non-linear distortion effects from PAs in the transmit antenna arrangement are prevented or reduced at a receiver receiving the transmitted signal. Consequently there is no longer a need for compensating for mutual coupling-based distortion by means of complex digital pre-distortion methods. Instead, less complex compensation methods such as, e.g., single-antenna system DPDs can be employed also in large antenna array systems.

According to some aspects, the pre-coder is arranged to assign each of the M independent data streams to one out of a number G of separate groups. The pre-coder comprises G processors, and each such processor is arranged to receive one respective group of independent data streams and to output transmit signal components to one respective sub-set of antenna elements selected from the N antenna elements such that a distance between any two antenna elements in a sub-set is larger than distance $D_{min}$.

Hereby, mutual coupling-based distortion from PAs is mitigated in a low complex manner by a mapping of data streams to antenna elements selected to reduce correlation between some transmit signal components corresponding to nearby antenna elements. No extensive signal processing is required in addition to said mapping, allowing for an efficient implementation in terms of production and operational costs.

According to some other aspects, the pre-coder comprises a joint beamforming and de-correlation module configured to generate the N transmit signal components by processing the independent data streams $s_j$, j=1, 2, . . . , M, by a linear pre-coding matrix A. This matrix A is derived for a configured beamforming pattern under constraints on a suppressed correlation between two or more transmit signal components.

Thus, mutual coupling-based distortion from PAs is mitigated by means of signal processing of the independent data streams, avoiding the need for mapping data streams to sub-sets of the antenna elements. This allows for the use of a larger number of antenna elements for transmission of each data stream.

There is also disclosed herein a network node comprising the antenna arrangement discussed above.

The object is furthermore obtained by a method in an antenna arrangement for radio transmission. The method comprises receiving a number M<N of independent data streams $s_j$, j=1, 2, . . . , M, by a pre-coder, and generating a number N of transmit signal components $TX_i$ i=1, 2, . . . , N, from the M of independent data streams. The generating here comprises suppressing a correlation between transmit signal components $TX_{i1}$ and $TX_{i2}$. The method also comprises outputting the N transmit signal components to respective antenna elements $a_i$ i=1, 2, . . . , N, comprised in an antenna array, wherein antenna elements $a_{i1}$ and $a_{i2}$ corresponding to transmit signal components $TX_{i1}$ and $TX_{i2}$ are arranged adjacently in the antenna array.

In addition to the above method, there is also provided herein computer programs comprising computer program code which, when executed in an antenna arrangement, or in a network node, causes the antenna arrangement or network node, respectively, to execute methods according to the present teaching.

The computer programs, the methods, and the network node, display advantages corresponding to the advantages already described in relation to the antenna arrangement.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIG. 1a is a schematic overview of a radio access network.

DETAILED DESCRIPTION

Figure 1B:
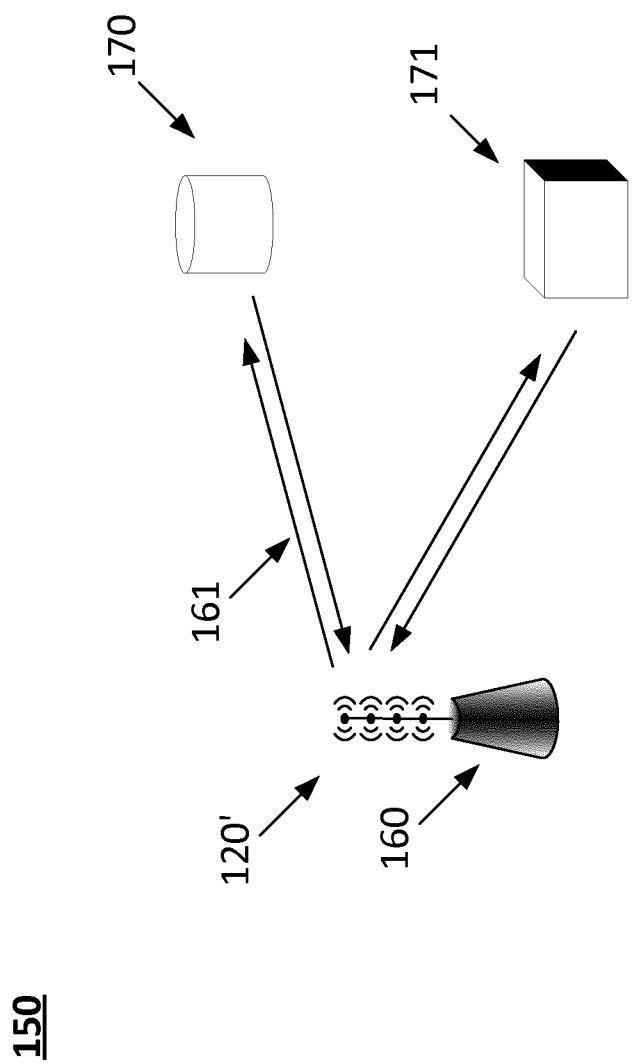
FIG. 1b is a schematic overview of a radar transceiver system.

The present teaching relates to mitigating transmit signal distortion experienced by one or more receivers in wireless systems using antenna arrays for transmission of wireless signals, such as the large antenna arrays used in massive multiple-input multiple-output (MIMO) systems. The present technique is applicable in wireless communication systems as well as in radar systems and any other wireless systems using antenna arrays for transmission of wireless signals.

Herein, mitigating transmit signal distortion is to be construed as mitigating the distortion experienced by a receiver of the transmitted signal, i.e., after the transmitted signal has propagated from transmitter to receiver via a channel. Thus, transmit signal components transmitted from individual antenna elements in an antenna array are not necessarily of low distortion. On the contrary, they are in some cases likely to be heavily distorted, but this distortion is mitigated when transmit signal components combines at a receiver.

The techniques disclosed herein are applicable in a wide variety of areas, including wireless communication as well as in radar and positioning systems. The transmitting arrangement may be distanced from the receiving arrangement, as in the communication system discussed in connection to FIG. 1a below, or co-located with the receiving arrangement, as in the radar system discussed in connection to FIG. 1b below.

As mentioned in the background section, mutual coupling effects between antenna elements, such as leakage between adjacent antenna elements entering into corresponding PAs, causes distortion components that are difficult to predict and compensate for by a DPD algorithm.

In the publication "Prediction of Smart Antenna Transmitter Characteristics Using a New Behavioral Modeling Approach", by Christian Fager, Xavier Bland, Katharina Hausmair, Jessica Chani Cahuana, and Thomas Eriksson, presented at the IEEE International Microwave Symposium, 1-6 Jun. 2014, and published in its proceedings on pp. 1-4, PA models which take mutual coupling effects between PAs are presented. One such model, not accounting for memory effects in the PA, can be written as $$y[n] = \sum_{p_1=1}^{P_1} \alpha_{p_1} x[n] |x[n]|^{2(p_1-1)} +$$

$$\sum_{p_2=1}^{P_2} \beta_{p_2} x_r[n] |x[n]|^{2(p_2-1)} + \sum_{p_2=1}^{P_2} \gamma_{p_2} \bar{x}_r[n] x^2[n] |x[n]|^{2(p_2-2)}$$

where y[n] models a signal transmitted from a given PA in an antenna array, i.e., a transmit signal component, at discrete time instant n, $P_1$ and $P_2$ are model parameters describing the order of modelling non-linear effects, α, β, and γ (indexed by $p_1$ and $p_2$) are model parameters describing mutual coupling and distortion effects, x[n] is the input transmit signal component to the PA, $x_r$ is a leakage component due to mutual coupling, and $\bar{x}$ denotes the complex conjugate of complex variable x.

In the model above, the term $A=\sum_{p_1=1}^{P_1} \alpha_{p_1} x[n]|x[n]|^{2(p_1-1)}$ corresponds to a transmit signal component with distortion equal to that of a single antenna element system without mutual coupling effects, while the terms $B=\sum_{p_2=1}^{P_2} \beta_{p_2} x_r[n] |x[n]|^{2(p_2-1)}$ and $C=\sum_{p_2=1}^{P_2} \gamma_{p_2} \bar{x}_r[n] x^2[n] |x[n]|^{2(p_2-2)}$ represent non-linear distortion due to mutual coupling between antenna elements in the antenna array. It is mainly the terms B and C that give rise to the complexity increase in MIMO DPDs discussed in the background section.

By computer simulation and mathematical modelling of wireless systems, discussed below in connection to FIGS. 11 and 12, it has been discovered that the non-linear distortive effect on a receiver from the additional distortion that originate from mutual coupling between antenna elements, i.e., terms B and C above, is dependent on the correlation between the signals fed to mutually coupled antenna elements. With suppressed correlation between at least some transmit signal components, the impact of terms B and C above on a receiver of the transmitted signal is reduced. This effect is due to the averaging that occurs when a number of transmit signal components combine at a receiver.

Particularly, if the correlation between transmit signal components transmitted from strongly coupled antenna elements, e.g., adjacent antenna elements, is suppressed, then non-linear distortion will be mitigated by the averaging of transmit signal components which occur at a receiver without need for complex DPD algorithms that actively compensate for a mutual coupling-based non-linear transmit signal distortion effect.

Aspects of the present disclosure will now be described more fully with reference to the accompanying drawings. The apparatus, computer program and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1a illustrates a wireless communication system 100 in which some aspects of the present teaching are applicable. The wireless communication system 100 includes user equipments, UEs, i.e., wireless devices 106, 108, and 110 in communication with a base station 102. Base station 102 provides coverage for cell 104. The base station 102 is in communication with a control node or network node 114 via a network 112. The network node 114 may be any network node such as a Radio Network Controller, RNC, a Mobility Management Entity, MME, a Mobile Switching Center, MSC, or Base Station Subsystem, BSS. The base station 102, according to aspects, operates using space division multiple access, SDMA, where, if the distance between the wireless devices 106, 108, and 110 is more than a minimum distance, the base station may reuse the same time-frequency resource for more than one wireless device. Thus, the base station 102 is, according to some aspects, arranged for beam-forming a transmitted signal towards one or more receivers by means of an antenna arrangement 120.

FIG. 1b illustrates a radar system 150 in which some aspects of the present teaching are applicable. Here, a radar transceiver 160 emits and receives wireless signals 161 using an antenna arrangement 120'. The wireless signals are reflected by a number of targets 170, 171.

Figure 2:
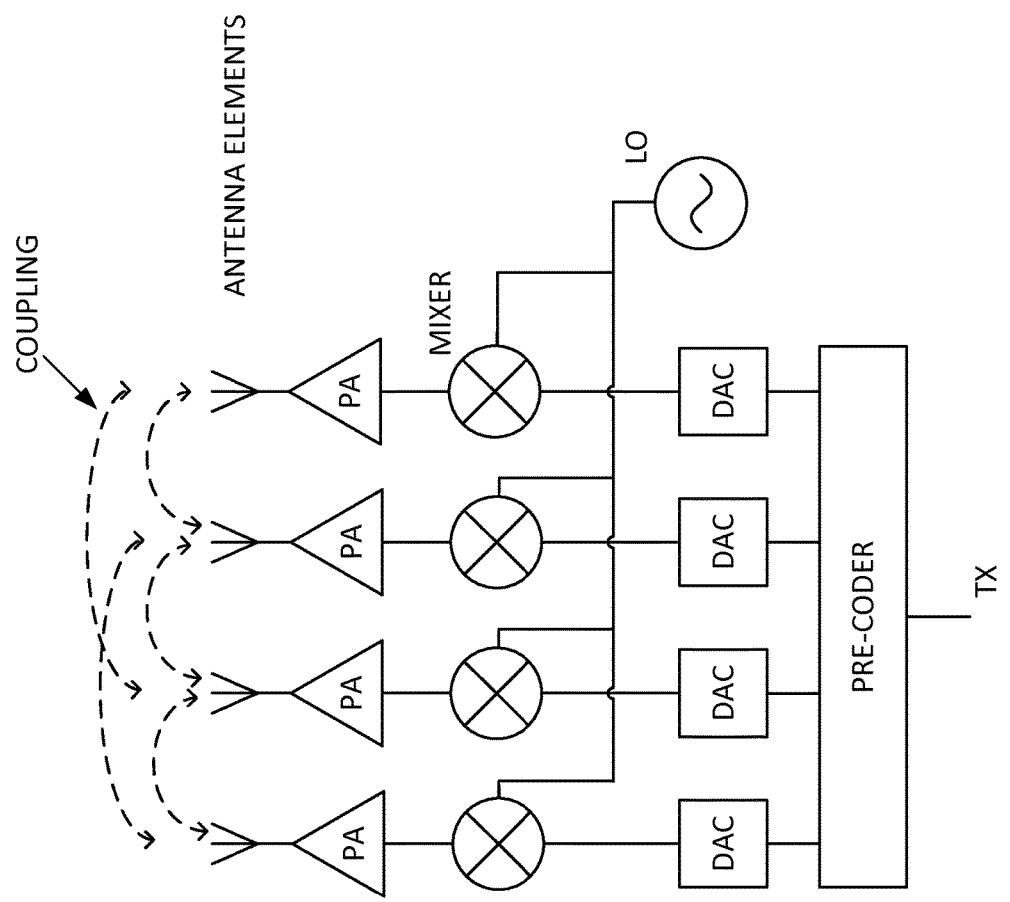
FIG. 2 is a block diagram illustrating an antenna arrangement with mutual coupling effects.

FIG. 2 is a block diagram illustrating aspects of an antenna arrangement 200. The antenna arrangement 200 is configured to receive a transmit signal vector TX. This transmit signal vector TX is processed by a pre-coder which processes the transmit signal vector to generate a number of transmit signal components, and maps the result to a number of antenna ports. Thus, each antenna port receives one transmit signal component which it forwards towards a respective antenna element for transmission.

This one-to-one mapping between transmit signal components and antenna elements will be maintained throughout the present disclosure. Thus, each antenna element is configured to receive one respective transmit signal component, and no transmit signal component is fed to more than one respective antenna element.

Furthermore, a pre-coder is herein a unit or module in an antenna arrangement which processes a number M of input data streams and maps the processed result to a number N of antenna elements. The purpose of the pre-coder is, according to some aspects, to beam-form different components of the transmit signal vector to match the location of a number of corresponding receivers or targets.

The output from the pre-coder is converted into analog signals by a number of digital-to-analog converters (DAC) before being translated to radio frequency (RF) by mixers driven by a local oscillator (LO). Finally, transmit signal components are amplified by a number of power amplifiers (PA) before being transmitted from the antenna elements.

Distortion is introduced to the transmitted signal by all components of the antenna arrangement, such as the DACs and the mixers. However, the focus of the present teaching is the non-linear distortion introduced by PAs, which is often dominating distortion from other components. As mentioned above, the distortion from the PAs is quite complex and difficult to predict due to mutual coupling between antenna elements in the antenna arrangement 200, shown in FIG. 2 as dashed lines between antenna elements.

Wireless signals transmitted from an antenna arrangement comprising a number N of antenna elements will generate at least an equally large number N of receive signal components arriving at a receiver. It has been discovered that when this number of receive signal components combine at a receiver, then the mutual coupling-based non-linear distortion effect will be reduced if the correlation between transmit signal components transmitted from mutually coupled antenna elements is suppressed, or if the mutual coupling itself between antenna elements is suppressed.

Thus, according to aspects of the present teaching, in order to obtain the advantages of mitigating signal distortion in a received signal comprising a combination of transmit signal components, correlation between at least some of the transmit signal components of the different antenna elements should be suppressed. As will be made clear from the below discussion, suppressing correlation between transmit signal components can be achieved in different ways with the same technical effect of mitigating signal distortion in a received combination of transmit signal components.

A further beneficial effect is obtained if the transmit signal components traverse a multi-path channel between transmitter and receiver where the N transmit signal components transform into an even larger number N'>N of receive signal components that combine at the receiver. In this case the averaging effect has been discovered to be stronger due at least in part to that N'>N signal components arrive at the receiver with random phase.

The advantages of the proposed approach are at least two-fold. First, the overall amount of inflicted distortion caused by the power amplifier will be averaged away at a receiver. Second, due to the suppression of the cross-coupled terms B and C discussed above, methods of low complexity for distortion mitigation in SISO systems may be deployed in order to reduce complexity, cost and power consumption of the antenna arrangement, since only the distortion in term A need to be compensated for.

FIGS. 3-10 are block diagrams illustrating antenna arrangements according to some of the aspects presented herein, i.e., antenna arrangements where correlation between two or more transmit signal components is suppressed, and in particular where a correlation between transmit signal components corresponding to adjacent antenna elements is suppressed.

Figure 3:
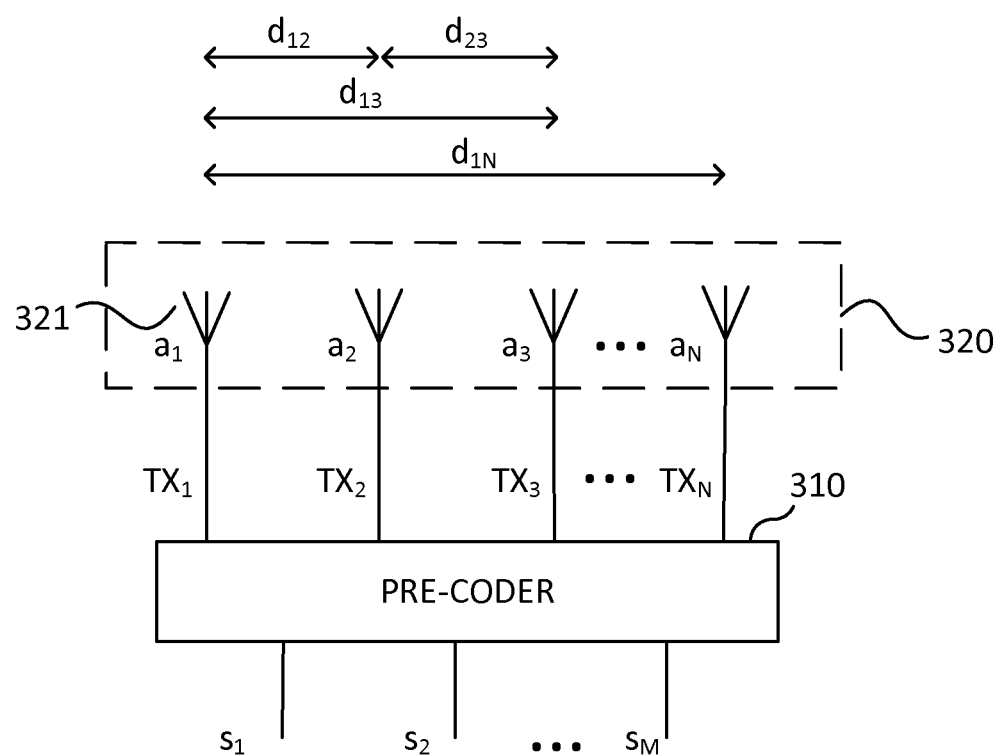
FIGS. 3-10 are block diagrams illustrating antenna arrangements according to some of the aspects presented herein.

FIG. 3 illustrates an antenna arrangement 300 for radio transmission comprising a pre-coder 310 connected to an antenna array 320. The antenna array 320 comprises a number N of antenna elements $a_i$ 321, i=1, 2, ..., N, each antenna element $a_i$ is configured to receive a respective transmit signal component $TX_i$ from the pre-coder 310. The pre-coder 310 is configured to receive a number M<N of independent data streams $s_j$, j=1, 2, ..., M, and to generate the N transmit signal components. As discussed above, in order to mitigate non-linear distortion effects, the generating comprises suppressing a correlation between transmit signal components $TX_{i1}$ and $TX_{i2}$ received by antenna elements $a_{i1}$ and $a_{i2}$ arranged adjacently in the antenna array 320.

As mentioned above, one advantage of the proposed solution to distortion mitigation is that it prevents the issue of mutual coupling-based distortion instead of compensating for it, which implies that less complex approaches to RF PA impairment compensation can be used, such as single antenna DPD algorithms designed for use in single-input single-output (SISO) systems.

Thus, by the present teaching, the pre-coder is now also used for suppressing correlation between transmit signal components transmitted from adjacent or otherwise coupled antenna elements in addition to, e.g., beam-forming. By configuring one or more pre-coders and an antenna array to suppress correlation between two or more transmit signal components, the mutual coupling-induced distortion experienced at a receiver is mitigated and distortion mitigation methods of reduced complexity may be deployed.

Of course, from a transmit signal correlation point of view, one approach would be to output un-correlated transmit signal components throughout the entire antenna array, i.e., to output a transmit signal component vector having a diagonal covariance matrix. This, however, can in some situations, e.g., in situations during which channel vectors are highly correlated, limit the ability of the antenna arrangement to also provide beamforming. However, since only antenna elements which have some measure of mutual coupling effect with respect to each other will contribute to the mutual coupling-based non-linear transmit signal distortion effect, only these transmit signal components need to be de-correlated in practice. According to aspects of the present technique, suppression of correlation between transmit signal components is performed based on physical distance, or based on a pre-determined mutual coupling effect between antenna elements or PAs in the antenna arrangement.

Thus, according to some aspects, the pre-coder 310 is arranged to output essentially un-correlated transmit signal components to antenna elements spaced at a distance in the antenna array 320 less than or equal to a distance $D_{min}$, and to output correlated transmit signal components to antenna elements spaced at a distance in the antenna array 320 larger than $D_{min}$.

Distance $D_{min}$ is, according to some aspects, determined as a distance between two antenna elements at which distance a mutual coupling effect between the two antenna elements exceeds a pre-determined mutual coupling effect threshold.

According to further aspects, the pre-coder 310 is arranged to suppress a correlation between at least two transmit signal components at a level of suppression determined based on an antenna mutual coupling coefficient between antenna elements corresponding to the at least two transmit signal components.

According to additional aspects, the pre-coder 310 is arranged to suppress a correlation between at least two transmit signal components at a level of suppression determined based on a physical distance between antenna elements in the antenna array 320 corresponding to the at least two transmit signal components.

Example implementations of how to accomplish this suppression of correlation between transmit signal components include dividing the array in sub-arrays which are then braided or interleaved. Groups of separate and independent users are then served on the different sub-arrays. Thus, the closest neighboring antenna elements will transmit independent data and therefore also un-correlated transmit signal components.

FIGS. 4-7 illustrate some aspects of this braiding or interleaving of sub-arrays. The pre-coder 310a-310d is here arranged to assign each of the M independent data streams to one out of a number G of separate groups. The pre-coder 310a-310d further comprises G processors 311. Each such processor is arranged to receive one respective group of independent data streams and to output transmit signal components to one respective sub-set of antenna elements 321 selected from the N antenna elements such that a distance between any two antenna elements in a sub-set is larger than distance $D_{min}$.

In this way the distance between antenna elements that output correlated transmit signal components is at least $D_{min}$. Thus, the mutual coupling-based non-linear transmit signal distortion effect due to mutual coupling between antenna elements and PAs in the antenna arrangement is mitigated at a receiver of the transmitted signal.

According to some aspects, G=2 and the antenna array 320a comprises antenna elements 321 essentially arranged on a line. A first and a second sub-set of antenna elements is then selected from the N antenna elements by assigning every other antenna element in the antenna array to the first sub-set, and remaining antenna elements to the second sub-set.

Figure 4:
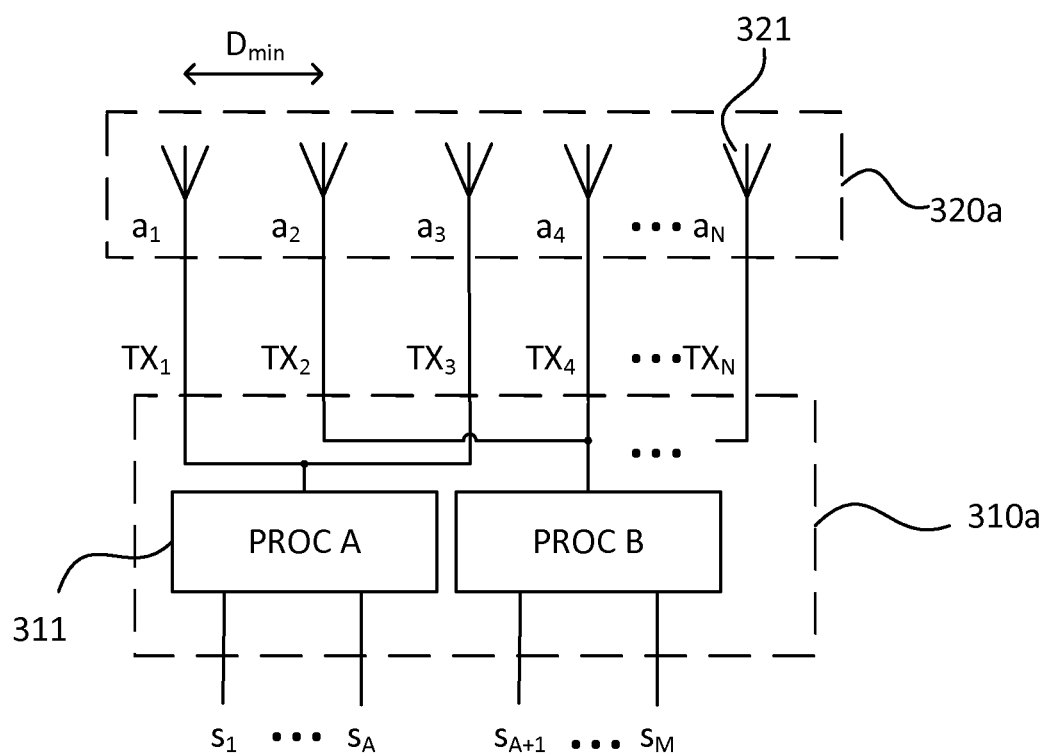

An example of an antenna arrangement with two groups, i.e., where G=2, is illustrated in FIG. 4. Two processors, shown in FIG. 4 as PROC A and PROC B receives independent data streams $s_1$-$s_A$, and $s_{A+1}$-$s_M$, processes the input data streams, and outputs the result on respective groups of antenna elements. Note that the groups of antenna elements are disjoint, i.e., no antenna element is a member of more than one group of antenna elements.

Figure 5:
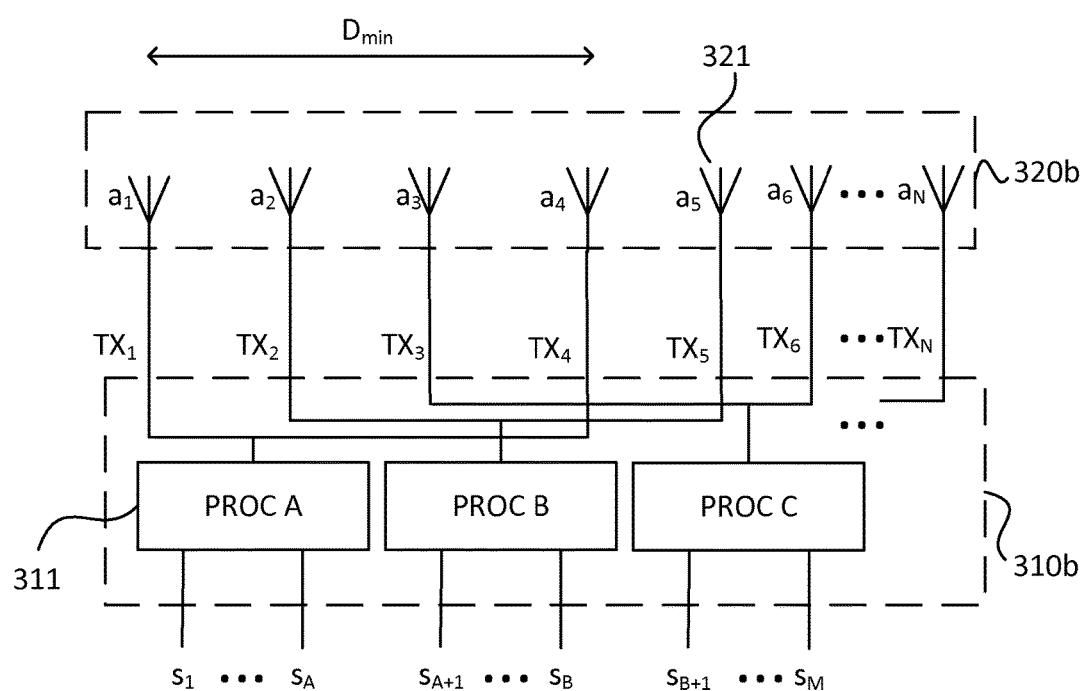

As noted above more than two sets of antenna elements can be braided in an antenna arrangement. An example of an antenna arrangement with three groups, i.e., where G=3, is illustrated in FIG. 5. Thus, according to some aspects, G>2, the antenna array 320b comprises antenna elements 321 essentially arranged on a line, and G sub-sets of antenna elements are selected from the N antenna elements by interleaving transmit signal components from the G processors 311 along the antenna array line. An advantageous effect is achieved with an increasing number of groups in that distance $D_{min}$ can be made larger. I.e., the more groups that are configured, the larger the distance will be between antenna elements that output correlated transmit signal components.

Of course, the present teaching is applicable for any type of antenna array geometry. One such geometry different from the one-dimensional geometry illustrated in FIGS. 4 and 5, is a rectangular geometry.

Figure 6:
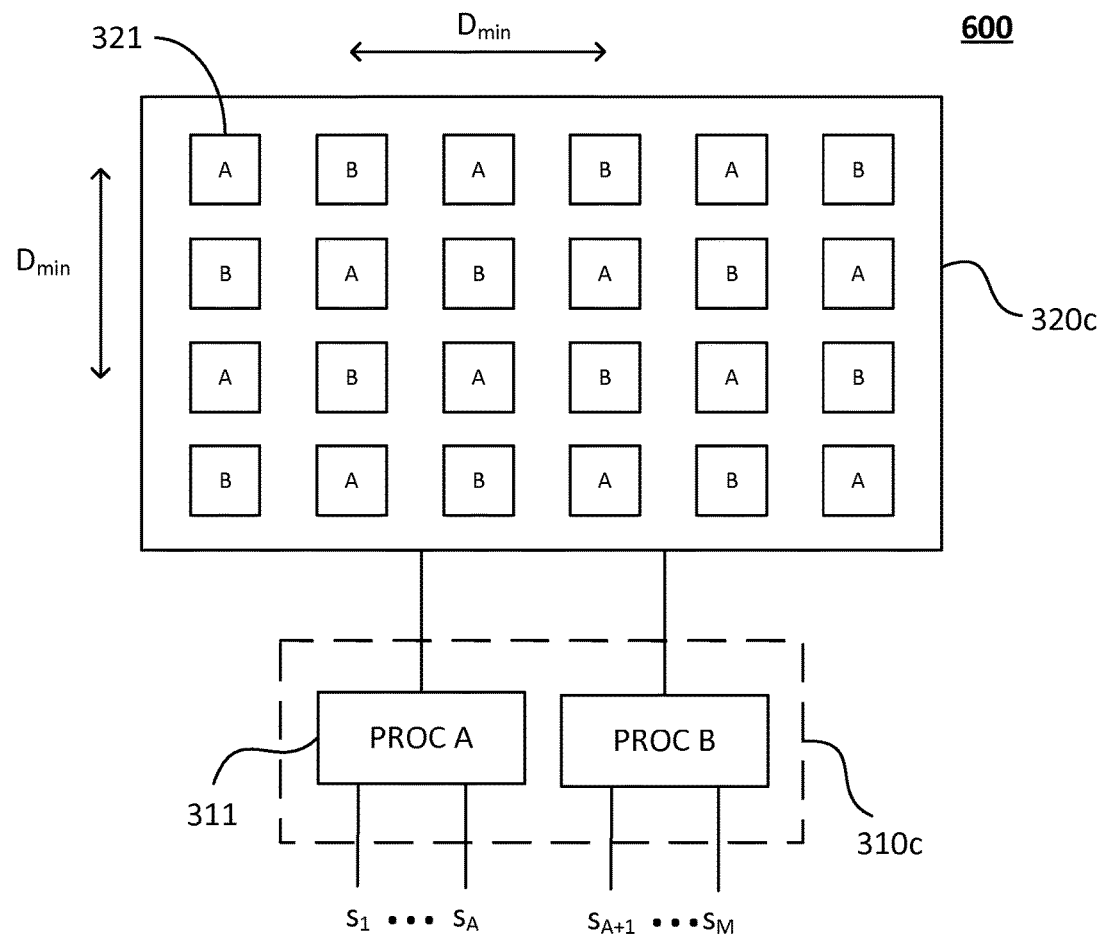

One such rectangular geometry antenna array 320c is illustrated in FIG. 6. Thus, according to aspects, the N antenna elements 321 are arranged in a rectangular antenna array 320c and G=2. First and second sub-sets of antenna elements are then selected from the N antenna elements by interleaving transmit signal components from the two processors 311 over the rectangular antenna array 320c. The antenna elements 321 in FIG. 6 which output transmit signal components from processor PROC A is marked by a capital 'A', and the antenna elements 321 in FIG. 6 which output transmit signal components from processor PROC B is marked by a capital 'B'. Here, adjacent antenna elements are interpreted as antenna elements adjacent in either horizontal or vertical direction, and not in a diagonal direction.

Figure 7:
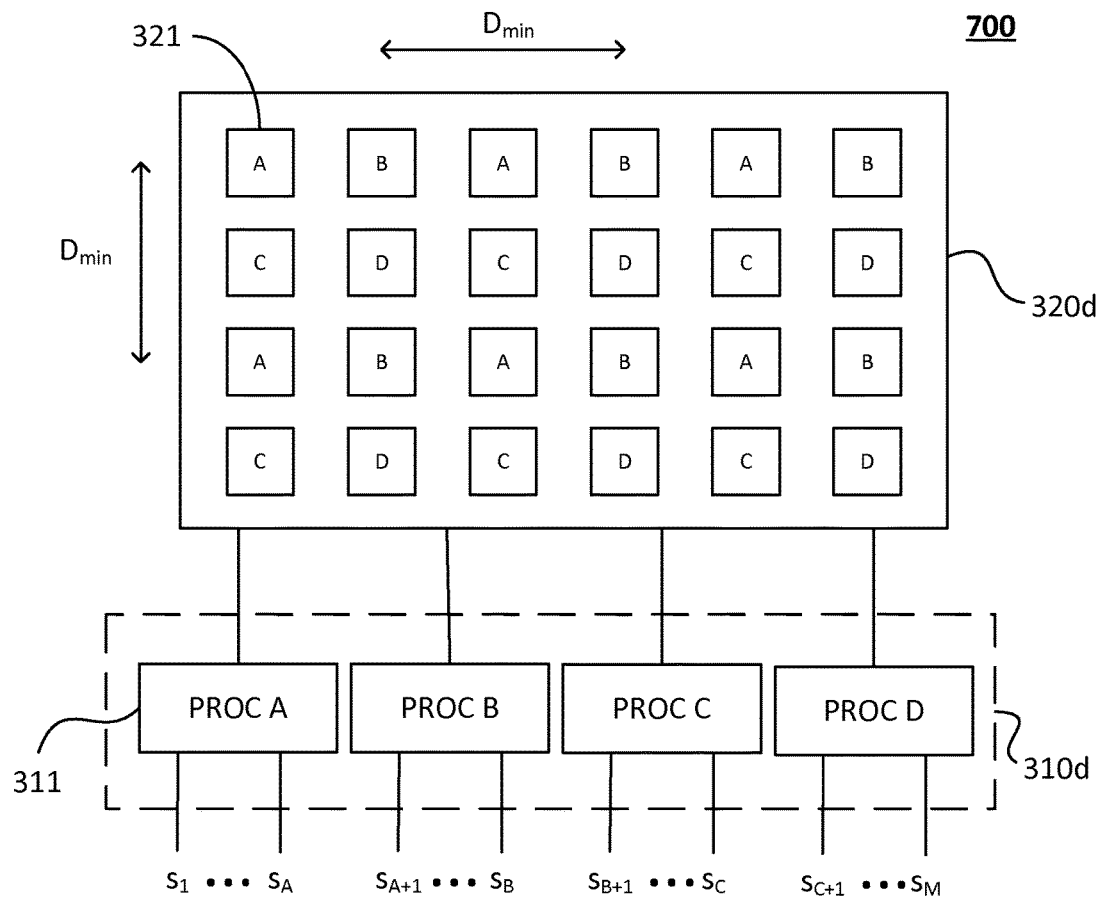

Other aspects of a rectangular geometry antenna array 320d is illustrated in FIG. 7. Here, the N antenna elements 321 are arranged in a rectangular antenna array 320d and G=4. First through fourth sub-sets of antenna elements are selected from the N antenna elements by interleaving transmit signal components from the four processors 311 over the rectangular antenna array. The antenna elements 321 in FIG. 7 are marked with capital letters 'A' through 'D' which indicate the source processor PROC A though PROC D feeding the antenna element in question. Here, adjacent antenna elements are interpreted as antenna elements adjacent in either of a horizontal, a vertical, or a diagonal direction.

An alternative, or complement, to suppressing correlation by interleaving subsets of antenna elements, is to suppress correlation by means of digital signal processing (DSP). This approach to suppressing correlation and achieving a reduced non-linear distortion effect will be further detailed below in connection to FIGS. 8-9. It is appreciated that the techniques of suppressing correlation by interleaving, and suppressing correlation by digital signal processing are not necessarily alternative techniques. On the contrary, the two techniques may be applied together. For instance, DSP can be used to de-correlate transmit signal components in a sub-set of antenna elements, and interleaving can be used to de-correlate sub-sets of transmit signal components.

Figure 8:
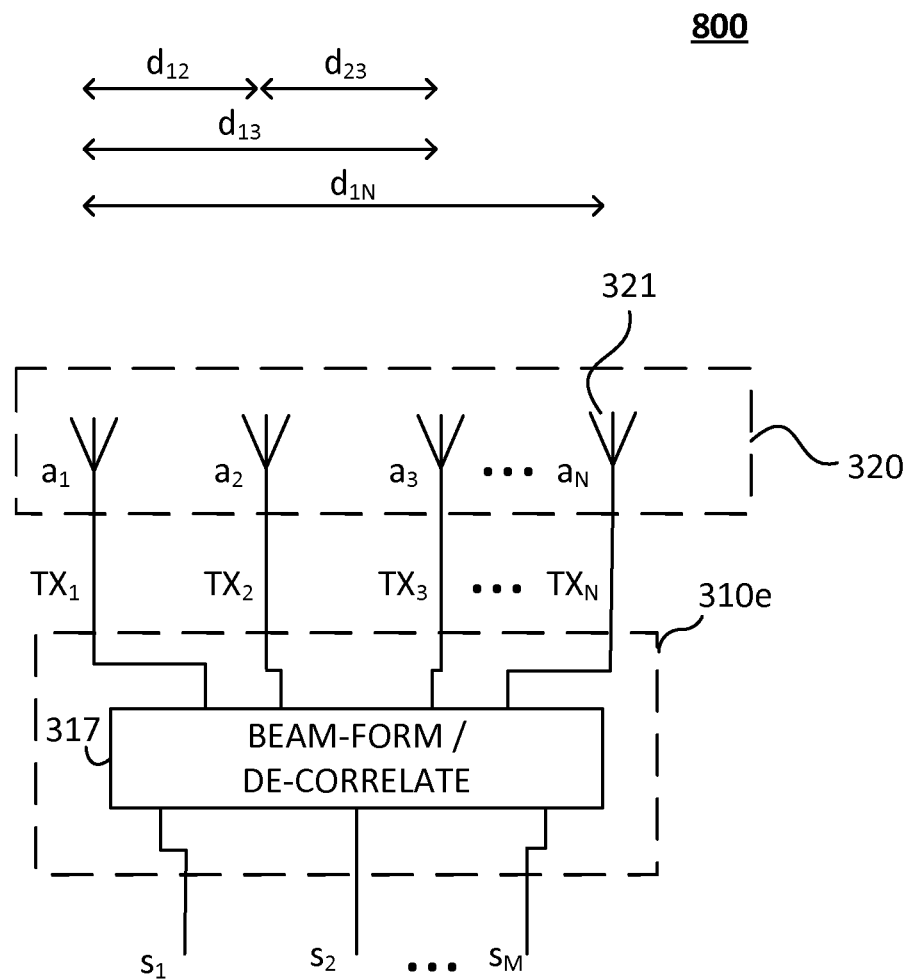
Figure 9:
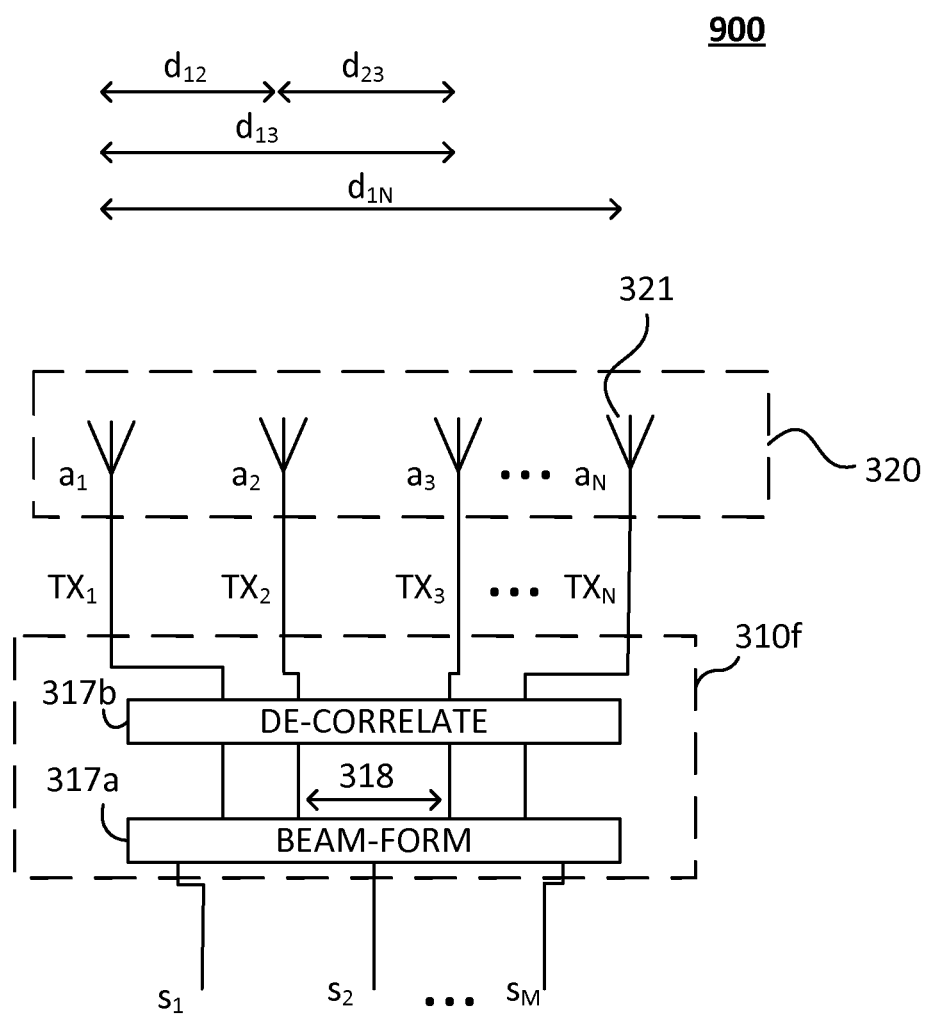

Thus, according to aspects illustrated in FIG. 8, the pre-coder 310e comprises a joint beamforming and de-correlation module 317 configured to generate the N transmit signal components by processing the independent data streams $s_j$, j=1, 2, . . . , M, by a linear pre-coding matrix A. Matrix A is derived for a configured beamforming pattern under constraints on a suppressed correlation between two or more transmit signal components.

A suitable matrix A can be found using a number of methods and techniques known from mathematical optimization, or derived using linear algebra.

Thus, matrix A is, according to some aspects, derived by optimization of the beamforming weights, i.e., amplitude and phase, which are applied to the input data streams before mapping to antenna elements as transmit signal components, under constraints on suppressing correlation between two or more transmit signal components.

According to some other aspects, matrix A is derived using a total least squares technique wherein the suppressed correlation enters as a constraint on the total least-squares formulation.

According to some further aspects, a beamforming matrix B is known which achieves a desired beamforming pattern for a pre-determined number of input data streams, although with un-wanted correlation between two or more transmit signal components. Matrix A is then derived as a matrix which gives the same or at least a substantially similar beamforming pattern as matrix B, or close to the same beamforming pattern, but with suppressed correlation between two or more transmit signal components.

The suppression of correlation between transmit signal components is not necessarily performed jointly with the beamforming. Thus, according to some aspects illustrated in FIG. 9, the pre-coder 310f comprises separate beamforming 317a and de-correlation 317b modules. The beam-forming module 317a is arranged to receive the independent data streams and to output N beamformed signal components 318 to the de-correlation module. The de-correlation module is configured to de-correlate two or more components of the N beamformed signal components, and to output N transmit signal components to corresponding antenna elements.

According to one aspect, the beamforming module 317a is not aware of the actions taken by the de-correlation module 317b, which acts in a manner transparent to the rest of the system. Thus, according to some aspects, the de-correlation module 317b will appear as an effect from the propagation channel, and the beamforming module 317a will act to provide a beamforming pattern implicitly taking the de-correlation actions by the de-correlating module into account. In this way, successive convergence to the desired beamforming with suppressed correlation between two or more transmit signal components is obtained.

Figure 10A:
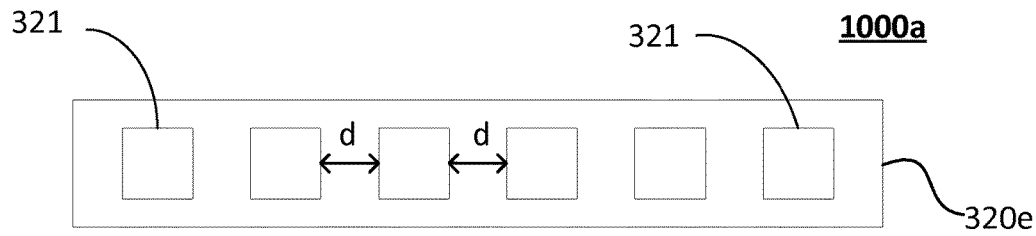
Figure 10B:
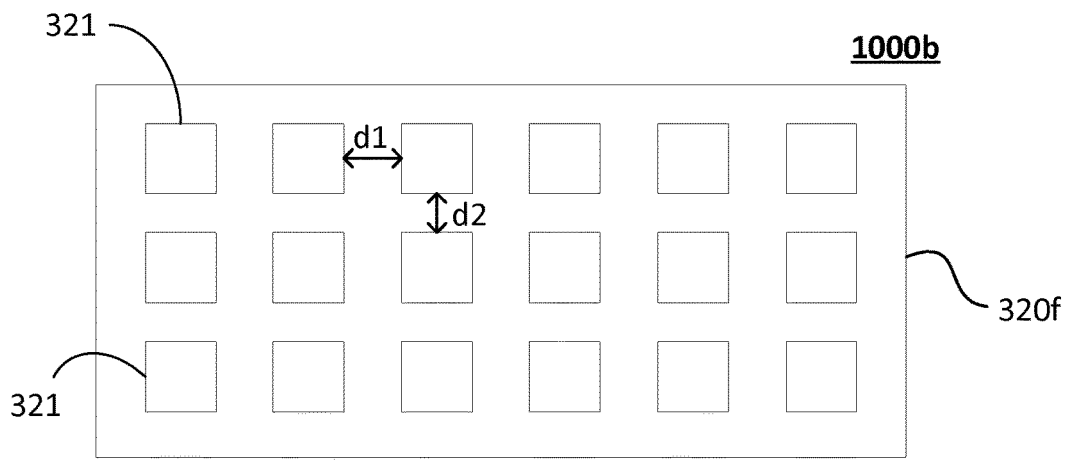
Figure 10C:
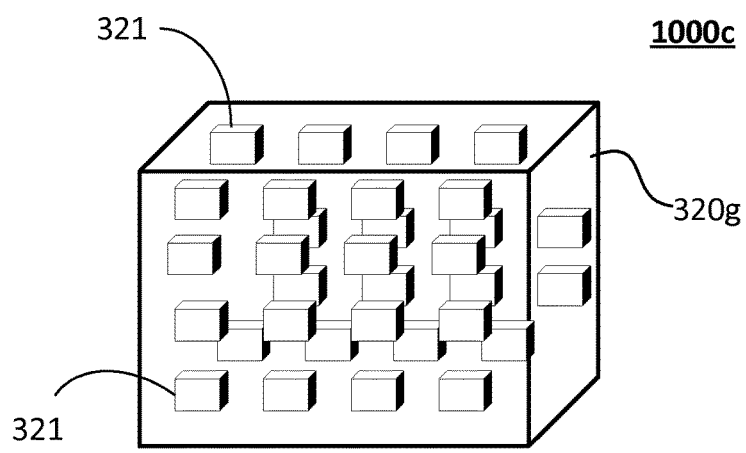

FIG. 10 shows aspects of an antenna arrangement, and in particular aspects of the antenna array 320 discussed above.

The antenna array 320a-320g is, according to different aspects, arranged according to different geometries. Such geometries include, but are not limited to; the N antenna elements 321 being arranged in a linear antenna array 320e, the N antenna elements 321 being arranged in a rectangular antenna array 320f, or the N antenna elements 321 being arranged in a three-dimensional antenna array 320g.

Combinations of different geometries are also possible, e.g., a rectangular antenna array complemented by a linear antenna array extending in some direction from the rectangular array. Other examples include so-called uniform linear arrays, ULAs.

With reference to FIG. 1a, one of the many applications of the present teaching is in a network node 102 in a communications system 100. Thus, there is disclosed herein a network node 102 comprising the antenna arrangement according to any of the aspects discussed above.

With reference to FIG. 1b, one of the many applications of the present teaching is in a radar transceiver 160. Thus, there is disclosed herein a radar transceiver 160 comprising the antenna arrangement according to any of the aspects discussed above.

Figure 11:
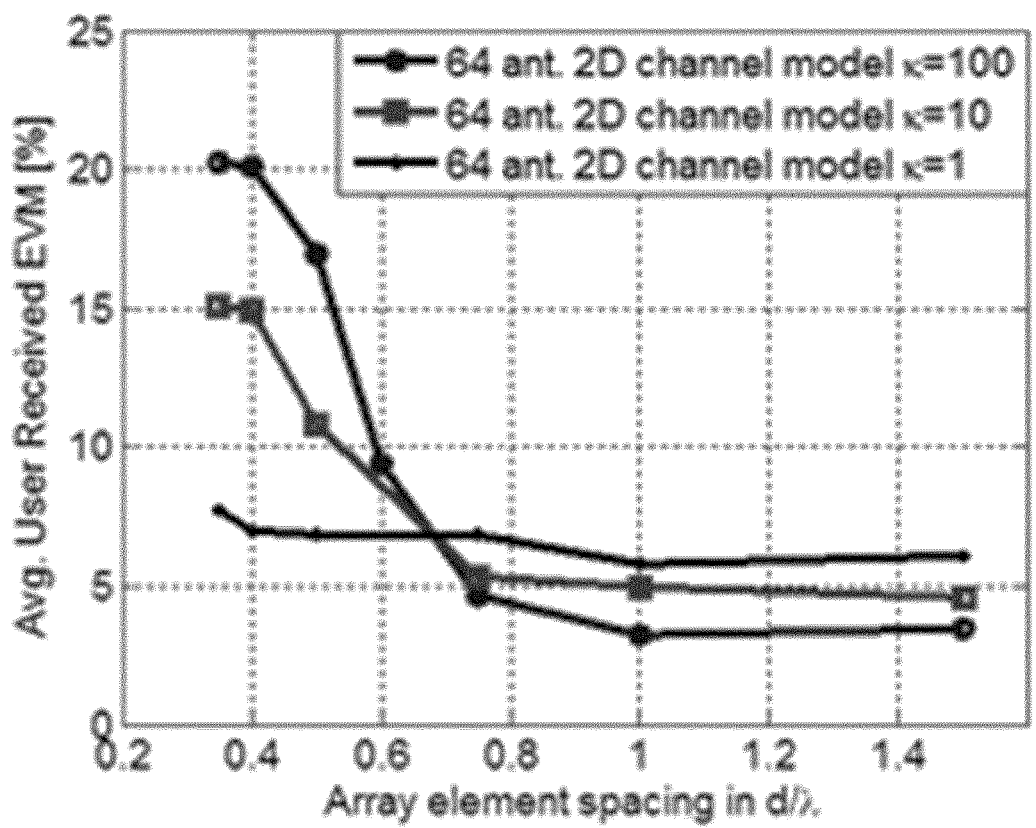
FIG. 11 is a graph of error vector magnitude vs. antenna element spacing.

FIG. 11 is a graph of error vector magnitude vs. antenna element spacing. FIG. 11 illustrates simulation results corresponding to the antenna arrangement 200 shown in FIG. 2, although with an antenna array of 64 antenna elements serving 4 users over a Rician channel, evaluated in terms of average user received error vector magnitude (EVM). Three different K-factors of the Rician channel are studied in the simulation; K=1, K=10, and K=100. A large K-factor implies a strong line-of-sight component with relatively little multi-path, and a smaller K-factor implies a relatively weak line-of-sight component with stronger multipath. Thus, as K increases the per-antenna correlation at a receiver of the transmit signal components decreases. As a result, the average user received EVM becomes more invariant to mutual coupling between elements with decreasing K-factor, which mutual coupling is increased as the array element spacing is decreased.

Thus, the effects of averaging non-linear distortion components at a receiver can be seen in FIG. 11. If the transmission channel has a strong line-of-sight component, i.e., if the K-factor of the Rician channel is large, then no significant multipath is present and the number of receive components will be essentially the same as the number N of transmit signal components generated by the transmitter antenna arrangement. If the transmit signal components are correlated, as will be the case if antenna element spacing is small (to the left on the x-axis), the non-linear distortion experienced by the receiver will be large. However, if the line-of-sight component is weaker relative to multipath components, i.e., if the K-factor of the Rician channel is smaller, then this effect will not be as pronounced since the correlated transmit signal components will give rise to a larger number of receive signal components that will combine at the receiver to provide an averaging effect.

Figure 12:
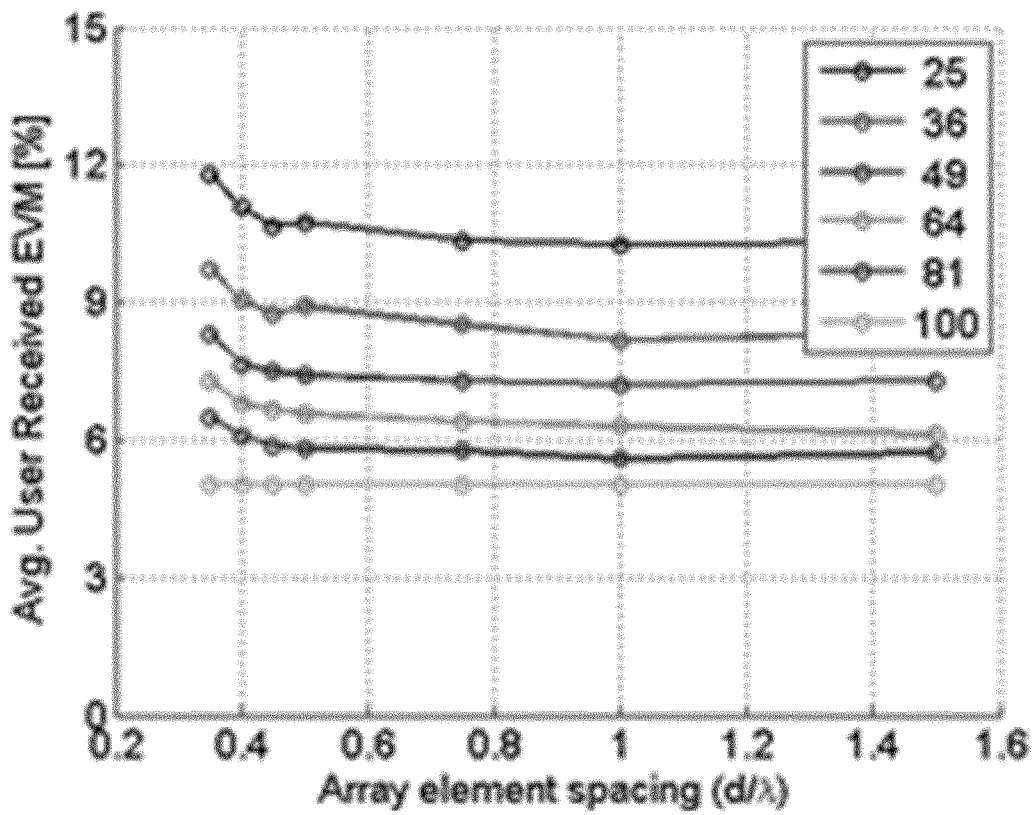
FIG. 12 is a graph of error vector magnitude vs. antenna element spacing.

FIG. 12 is a graph of error vector magnitude vs. antenna element spacing. FIG. 12 illustrates simulation results corresponding to different array sizes between 25 and 100 antenna elements, serving 4 users over a Rayleigh channel, i.e., a Rician channel with K-factor set to zero. As can be observed in FIG. 12, the average user received EVM scales strongly with the array size and is invariant toward mutual coupling effects for very large array sizes.

Thus, similar effects as was seen in FIG. 11 are seen also in FIG. 12. With a large number of antenna elements, i.e., 100 or more, the averaging effect is strong enough even when transmit signal components are relatively correlated (to the left on the x-axis), whereas a smaller number N of antenna elements are more sensitive to correlation between transmit signal components.

Thus, it is concluded that advantageous effects are obtain from suppressing a correlation between transmit signal components $TX_{i1}$ and $TX_{i2}$ received by antenna elements $a_{i1}$ and $a_{i2}$ arranged adjacently in the antenna array, i.e., electromagnetically coupled antenna elements.

Figure 13:
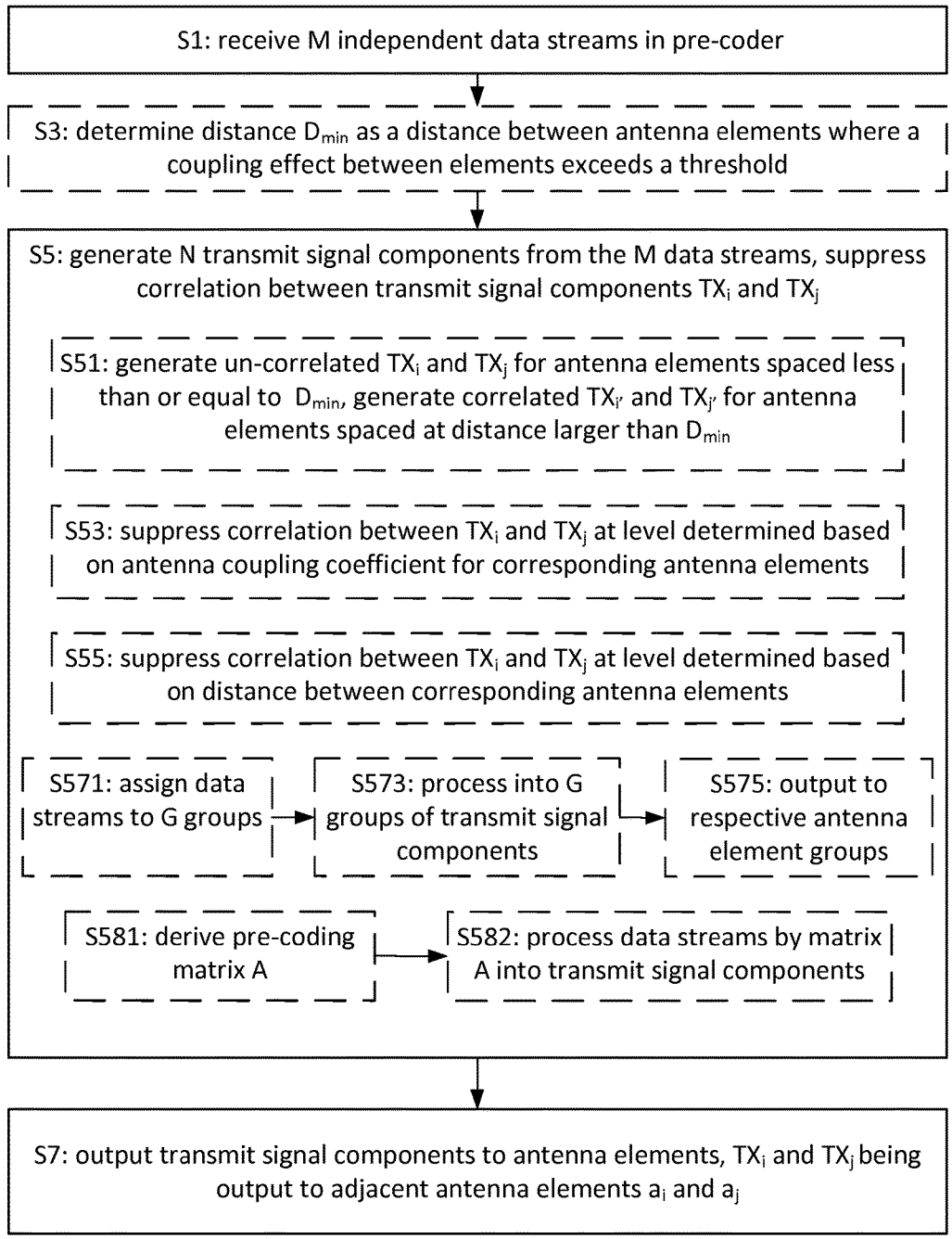
FIG. 13 is a flowchart illustrating methods in an antenna arrangement according to some of the aspects presented herein.

FIG. 13 is a flowchart illustrating methods in an antenna arrangement according to some of the aspects presented herein. In particular, there is illustrated a method in an antenna arrangement 300, 400, 500, 600, 700, 800, 900, 1000 for radio transmission. The method comprises receiving S1 a number M<N of independent data streams $s_j$, j=1, 2, . . . , M, by a pre-coder 310, and generating S5 a number N of transmit signal components $TX_{i1}$ i=1, 2, . . . , N, from the M of independent data streams, the generating comprising suppressing a correlation between transmit signal components $TX_{i1}$ and $TX_{i2}$. The method also comprises outputting S7 the N transmit signal components to respective antenna elements $a_i$ comprised in an antenna array 320, wherein antenna elements $a_{i1}$ and $a_{i2}$ corresponding to transmit signal components $TX_{i1}$ and $TX_{i2}$ are arranged adjacently in the antenna array 320.

As discussed above in connection to FIGS. 4-10, from a transmit signal distortion point of view, it would be beneficial to output un-correlated transmit signal components throughout the antenna array, i.e., to output a transmit signal component vector having a diagonal covariance matrix. This can in some situations limit the ability of the antenna arrangement to also provide beamforming. However, since only antenna elements which have some measure of mutual coupling effect with respect to each other will contribute to the mutual coupling-based non-linear transmit signal distortion effect, only these transmit signal components need to be de-correlated. According to aspects of the present technique, suppression of correlation between transmit signal components is performed based on physical distance, or based on a pre-determined mutual coupling effect between antenna elements, or between PAs in the antenna arrangement.

Thus, according to some aspects, the generating S5 comprises generating S51 essentially un-correlated transmit signal components corresponding to antenna elements spaced at a distance in the antenna array 320 less than or equal to a distance $D_{min}$, and generating correlated transmit signal components corresponding to antenna elements spaced at a distance in the antenna array 320 larger than $D_{min}$.

Means by which said essentially un-correlated transmit signal components can be generated include the arrangements illustrated in FIGS. 3-10.

The method, according to aspects, further comprises determining S3 distance $D_{min}$ as a distance between two antenna elements at which distance a mutual coupling effect between the two antenna elements exceeds a pre-determined mutual coupling effect threshold.

According to aspects, the generating S5 further comprises suppressing S53 a correlation between at least two transmit signal components at a level of suppression determined based on an antenna mutual coupling coefficient between antenna elements corresponding to the at least two transmit signal components.

According to aspects, the generating S5 further comprises suppressing S55 a correlation between at least two transmit signal components at a level of suppression determined based on a physical distance between antenna elements in the antenna array 320 corresponding to the at least two transmit signal components.

According to aspects, the generating S5 further comprises assigning S571 each of the M independent data streams to one out of a number G of separate groups, and processing S573 each group out of the G groups into a group of transmit signal components, as well as outputting S575 each group of transmit signal components to a respective sub-set of antenna elements selected from the N antenna elements such that a distance between any two antenna elements in a sub-set is larger than distance $D_{min}$.

The advantages and mechanisms behind the different aspects of assigning S571 each of the M independent data streams to one out of a number G of separate groups was discussed above in connection to FIGS. 4-7.

According to aspects, the generating S5 further comprises deriving S581 a linear pre-coding matrix A for a configured beamforming pattern under constraints on a suppressed correlation between two or more transmit signal components, and processing S582 the independent data streams $s_j$, j=1, 2, . . . , M, by the linear pre-coding matrix A into the N transmit signal components.

The advantages and mechanisms behind the different aspects of deriving S581 a linear pre-coding matrix A and processing S582 the independent data streams $s_j$, j=1, 2, . . . , M, by the linear pre-coding matrix A into the N transmit signal components was discussed above in connection to FIGS. 8-9.

The various aspects of the methods described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. An antenna arrangement for radio transmission comprising:
   an antenna array,
   a pre-coder connected to the antenna array, wherein
   the antenna array comprises a number N of antenna elements ai, i=1, 2, . . . , N−1, N, each antenna element ai being configured to receive a respective transmit signal component TXi from the pre-coder such that antenna element a1 is configured to receive transmit signal component TX1, antenna element a2 is configured to receive transmit signal component TX2 and antenna element aN is configured to receive transmit signal component TXN,
   the pre-coder is configured to receive a number M<N of independent data streams sj, j=1, 2, . . . , M, and to generate the N transmit signal components TX1 to TXN, wherein the pre-coder is configured to generate the N transmit signal components by performing a process comprising suppressing a correlation between transmit signal component TX1, which is received by antenna element a1, and transmit signal component TX2, which is received by antenna element a2, wherein a distance between antenna elements a1 and a2 is less than or equal to a distance Dmin, and the pre-coder is further arranged such that, for antenna elements ai and ak k1, 2, . . . N and k not equal to i, a transmit signal component received by antenna element ai is correlated with a transmit signal component received by antenna element ak when a distance between ai and ak is greater than Dmin and the transmit signal component received by antenna element ai is un-correlated with the transmit signal component received by antenna element ak when the distance between ai and ak is less than or equal to Dmin.

2. The antenna arrangement according to claim 1, wherein distance Dmin is determined as a distance between two antenna elements at which distance a mutual coupling effect between the two antenna elements exceeds a pre-determined mutual coupling effect threshold.

3. The antenna arrangement according to claim 1, wherein the pre-coder is arranged to suppress a correlation between at least two transmit signal components at a level of suppression determined based on an antenna mutual coupling coefficient between antenna elements corresponding to the at least two transmit signal components.

4. The antenna arrangement according to claim 1, wherein the pre-coder is arranged to suppress a correlation between at least two transmit signal components at a level of suppression determined based on a physical distance between antenna elements in the antenna array corresponding to the at least two transmit signal components.

5. The antenna arrangement according to claim 1, wherein the pre-coder is arranged to assign each of the M independent data streams to one out of a number G of separate groups, the pre-coder further comprising G processors, each such processor being arranged to receive one respective group of independent data streams and to output transmit signal components to one respective sub-set of antenna elements selected from the N antenna elements such that a distance between any two antenna elements in a sub-set is larger than distance Dmin.

6. The antenna arrangement according to claim 5, wherein G=2 and the antenna array comprises antenna elements essentially arranged on a line, a first and a second sub-set of antenna elements being selected from the N antenna elements by assigning every other antenna element in the antenna array to the first sub-set, and remaining antenna elements to the second sub-set.

7. The antenna arrangement according to claim 5, wherein G>2, the antenna array comprises antenna elements essentially arranged on a line, and G sub-sets of antenna elements are selected from the N antenna elements by interleaving transmit signal components from the G processors along the antenna array line, the N antenna elements are arranged in a rectangular antenna array and G=2, first and second sub-sets of antenna elements being selected from the N antenna elements by interleaving transmit signal components from the two processors over the rectangular antenna array, or the N antenna elements are arranged in a rectangular antenna array and G=4, first through fourth sub-sets of antenna elements being selected from the N antenna elements by interleaving transmit signal components from the four processors over the rectangular antenna array.

8. The antenna arrangement according to claim 1, the pre-coder comprising a joint beamforming and de-correlation module configured to generate the N transmit signal components by processing the independent data streams sj, j=1, 2, . . . , M, by a linear pre-coding matrix A, matrix A being derived for a configured beamforming pattern under constraints on a suppressed correlation between two or more transmit signal components.

9. The antenna arrangement according to claim 1, the pre-coder comprising separate beamforming and de-correlation modules, the beam-forming module being arranged to receive the independent data streams and to output N beamformed signal components to the de-correlation module, the de-correlation module being configured to de-correlate two or more components of the N beamformed signal components, and to output N transmit signal components to corresponding antenna elements.

10. The antenna arrangement according claim 1, wherein the N antenna elements are arranged in a linear antenna array.

11. The antenna arrangement according to claim 1, wherein the N antenna elements are arranged in a rectangular antenna array.

12. The antenna arrangement according to claim 1, wherein the N antenna elements are arranged in a three-dimensional antenna array.

13. A method in an antenna arrangement for radio transmission, wherein the antenna arrangement comprises: an antenna array and a pre-coder connected to the antenna array, wherein the antenna array comprises a number N of antenna elements ai, i=1, 2, . . . , N−1, N, each antenna element ai being configured to receive a respective transmit signal component TXi from the pre-coder such that antenna element a1 is configured to receive transmit signal component TX1, antenna element a2 is configured to receive transmit signal component TX2 and antenna element aN is configured to receive transmit signal component TXN, the method comprising:

receiving, by the pre-coder, a number M<N of independent data streams sj, j=1, 2, . . . , M; and generating, by the pre-coder, the N transmit signal components TX1 to TXN, wherein generating the N transmit signal components comprises suppressing a correlation between transmit signal component TX1, which is received by antenna element a1, and transmit signal component TX2, which is received by antenna element a2, wherein a distance between antenna elements a1 and a2 is less than or equal to a distance Dmin, wherein for antenna elements ai and ak k1, 2, . . . N and k not equal to i, a transmit signal component received by antenna element ai is correlated with a transmit signal component received by antenna element ak when a distance between ai and ak is greater than Dmin and the transmit signal component received by antenna element ai is un-correlated with the transmit signal component received by antenna element ak when the distance between ai and ak is less than or equal to Dmin.

14. The method according to claim 13, further comprising determining distance Dmin as a distance between two antenna elements at which distance a mutual coupling effect between the two antenna elements exceeds a pre-determined coupling effect threshold.

15. The method according to claim 13, wherein the generating further comprises:

suppressing a correlation between at least two transmit signal components at a level of suppression determined based on an antenna coupling coefficient between antenna elements corresponding to the at least two transmit signal components.

16. The method according to claim 13, wherein the generating further comprises:

suppressing a correlation between at least two transmit signal components at a level of suppression determined based on a physical distance between antenna elements in the antenna array corresponding to the at least two transmit signal components.

17. The method according to claim 13, wherein the generating further comprises:

assigning each of the M independent data streams to one out of a number G of separate groups, processing each group out of the G groups into a group of transmit signal components, outputting each group of transmit signal components to a respective sub-set of antenna elements selected from the N antenna elements such that a distance between any two antenna elements in a sub-set is larger than distance Dmin.

18. The method according to claim 13, wherein the generating further comprises:

deriving a linear pre-coding matrix A for a configured beamforming pattern under constraints on a suppressed correlation between two or more transmit signal components, and processing the independent data streams sj, j=1, 2, . . . , M, by the linear pre-coding matrix A into the N transmit signal components.

19. A computer program product comprising a non-transitory computer readable medium storing a computer program comprising computer program code which, when executed in an antenna arrangement, causes the antenna arrangement to execute a method according to claim 13.

* * * * *